April 18, 1961 K. R. SCRIBNER ET AL 2,980,103
APPARATUS FOR VAPORIZATION OF LIQUIDS
Filed July 30, 1958

Kenneth R. Scribner
Martin C. Sabath
INVENTORS

BY
ATTORNEYS

United States Patent Office 2,980,103
Patented Apr. 18, 1961

2,980,103
APPARATUS FOR VAPORIZATION OF LIQUIDS

Kenneth R. Scribner and Martin C. Sabath, Rochester, N.Y., assignors to Eastman Kodak Company, Rochester, N.Y., a corporation of New Jersey Filed July 30, 1958, Ser. No. 752,017

4 Claims. (Cl. 126—263)

This invention relates to a novel and improved apparatus for the vaporization of a liquid. In a specific aspect this invention relates to a novel and improved apparatus for the controlled vaporization of liquid ammonia in an ammonia vapor activated battery.

There are many examples of operations where the controlled or correctly-timed release of vaporized liquids is essential to the operations. For example, in an ammonia vapor activated battery it is necessary to provide means for vaporizing ammonia in the battery at the desired time in order that the battery will be activated and will provide electrical current at the desired time. It is therefore an object of this invention to provide novel apparatus for the vaporization of a liquid. It is another object of this invention to provide novel apparatus for the vaporization of liquid ammonia in an ammonia vapor activated battery. Further and additional objects of this invention will be apparent from the detailed disclosure.

Figure 1:
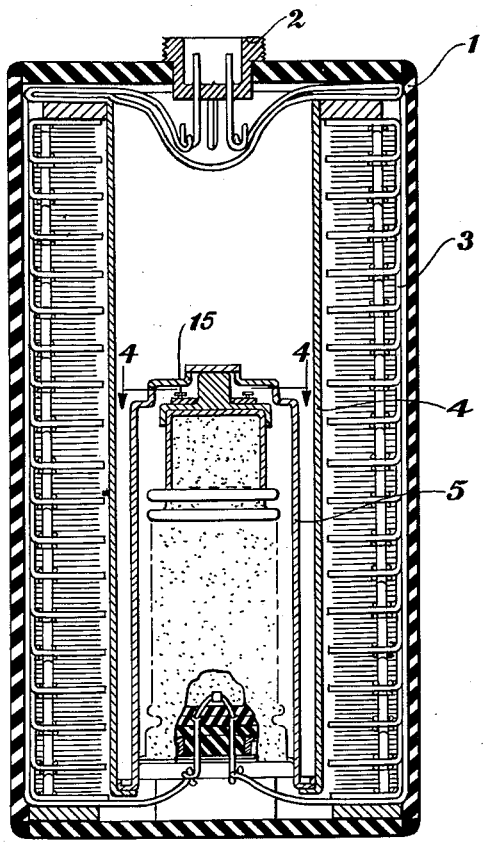
Fig. 1 is an elevational view of a cross section of an ammonia vapor activated battery.
Figure 3:
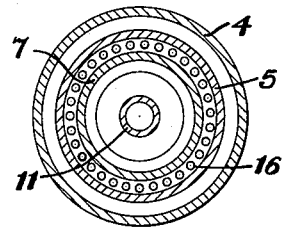
Fig. 3 is a bottom view through 3—3 and Fig. 4 is a top sectional view through 4—4 of the ammonia vaporizing and ammonia gas releasing mechanism for use in the ammonia vapor activated battery.
Figure 2:
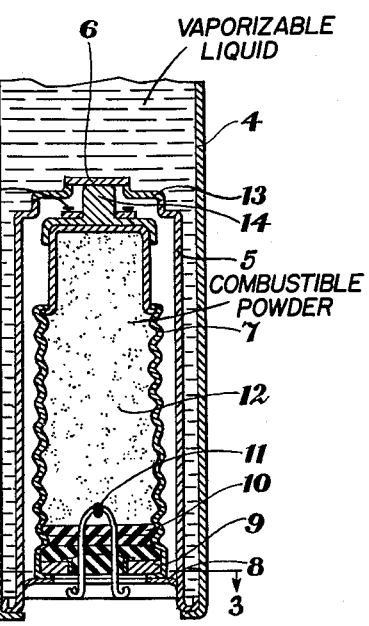
Fig. 2 is an elevational view of a cross section of the ammonia vaporizing and ammonia gas releasing mechanism for use in the ammonia vapor activated battery.
Figure 4:
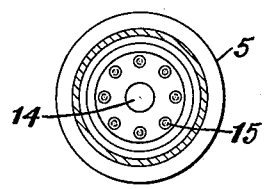

In Figs. 1, 2, 3 and 4, like parts are numerically designated by the same numerals wherever they appear.

Referring now to Figs. 1, 2, 3 and 4, the components of the battery are disposed within outer case 1 which can be formed of a metal such as aluminum. The top of case 1 is provided with terminal connector 2 through which the battery is connected to any device or equipment which is to be provided with electrical current by the battery. Terminal connector 2 is suitably joined in the battery to the assembly of anode and cathode plates 3. The assembly of anode and cathode plates is formed of alternating zinc and lead dioxide plates separated by insulating pads impregnated with a dry solute, for example, ammonium thiocyanate. The stack assembly plates are disposed in the annular space between outer case 1 and outer tube 4 containing the battery activating mechanism. Tube 4 is filled to the desired level with liquid ammonia and a cavity is provided in the base of tube 4 for insertion of the mechanism for vaporizing the liquid ammonia and thus activating the battery. The cavity in the base of tube 4 is formed by outer container 5 for the ammonia vaporizing device.

Outer container 5 is provided with an initial release cap 6 which can be soldered or otherwise weakly joined in a leakproof manner to the top of container 5 and is thus readily disengageable from the top of container 5. Expandable container 7 is disposed within container 5 and forms an annular space therewith. Container 7 is a bellows-heat powder assembly which is held in place by means of steel retaining ring or support 8 and the base of container 7 is provided with metal cover 9 and insulation pads 10. Ring 8 can contain perforations 16 or be in the form of a spider to permit the passage of vaporized ammonia. Container 7 is further provided with an electrical match or ignition device 11 which is connected to a suitable source of electricity. Upon ignition of heat powder 12 by means of an electrical pulse to match 11 heat powder 12 disposed in container 7 releases a sufficient amount of gas at an elevated temperature to expand the bellows assembly of container 7. The force of the expanding gas and the softening of the solder caused by the heat of the burning powder is sufficient to overcome the hydrostatic pressure of the liquid ammonia on initial release cap 6 so that the cap becomes disengaged and is separated from the top of container 5. As a result of this separation of cap 6 liquid ammonia under its own pressure is free to flow through the opening created thereby and into the annular space between outer container 5 and bellows assembly 7. As the liquid ammonia flows over heated assembly 7 the ammonia is vaporized and its temperature is raised to the desired level.

For ammonia gas releasing units of the smaller type the removal of cap 6 from the top of container 5 permits an adequate rate of flow of ammonia into container 5 and no further opening or rupturing of container 5 is needed. For larger types of units it is desirable to provide container 5 with final release cap 13 which is also soldered or otherwise weakly attached by a leakproof joint to the top of container 5 and thus is readily disengageable. As bellows assembly 7 expands further as a result of the gas formation by the heat powder, bellows assembly 7 exerts a force against final release cap 13 on the top of container 5. The portion of bellows assembly 7 that contacts cap 13 can be provided with small buttons 15 or curves that prevent the bellows assembly from completely sealing off the flow of ammonia against cap 13. At this point the hydrostatic pressure of ammonia on both sides of cap 13 has been equalized and the force required to lift off the final release cap 13 is relatively small. Separation of cap 13 from container 5 permits additional ammonia to flow across heated bellows assembly 7 and the additional ammonia is vaporized in this manner. The vaporized ammonia passes through openings in ring 8 and into the annular space between outer case 1 and tube 4 containing the assembly of anode and cathode plates 3.

The primary purpose of removing cap 6 from the top of container 5 is to equalize the hydrostatic pressure on final release cap 13. In some instances this purpose can be accomplished by a piercing or puncturing of cap 6 without an initial complete removal of cap 6.

The vaporized ammonia deliquesces upon the lead thiocyanate in the insulating pads in stack plate assembly 3 to form a solution of lead thiocyanate in liquid ammonia. As a result of the formation of this solution of lead thiocyanate in liquid ammonia the battery is activated and generates an electrical current.

The amount of heat powder used in bellows assembly 7 is determined by the amount of heat required to vaporize and raise the temperature of the ammonia to the desired level. The amount of heat powder required is not determined by the force required to separate caps 6 and 13 from container 5. To assist in the release of cap 6 from container 5 bellows assembly 7 is provided with a button or other similar protuberance 14 which presses against cap 6 as the gas pressure causes expansion within assembly 7. The amount of force produced by the minimum required quantity of heat powder is not sufficient to separate final release cap 13 directly from container 5. It is first necessary to push off and thus release initial cap 6 so that the hydrostatic pressure on final release cap 13 is nullified.

A satisfactory heat powder composition for use in expandable container 7 contains barium chromate (94%), aluminum (3%) and boron (3%). However, other compositions and ratios of components can be used. The match or ignition device 11 can contain lead monoresorcinate, potassium perchlorate and nitrocellulose, and with this composition a current of about 1½ volts is required for ignition.

This invention has been described in detail with particular reference to preferred embodiments thereof, but it will be understood that variations and modifications can be effected within the spirit and scope of the invention as described above and as defined in the appended claims.

We claim:

1. Apparatus for vaporizing a liquid which comprises, in combination, an outer container and an inner container forming therebetween a space for liquid to be vaporized, the top of said inner container being rupturable and below the top of said outer container, said inner container having disposed therein an expandable third container enclosing a gas-forming combustible substance which upon ignition forms sufficient gas to expand said third container and sufficient heat to vaporize said liquid as said liquid contacts said third container, means for igniting said gas-forming combustible substance and means responsive to the expansion of said third container for rupturing the top of said inner container.

2. Apparatus for vaporizing a liquid which comprises, in combination, an outer container and an inner container forming therebetween a space for liquid to be vaporized, at least a portion of the top of said inner container being disengageable from said inner container and below the top of said outer container, said inner container having disposed therein an expandable third container enclosing a gas-forming combustible substance which upon ignition forms sufficient gas to expand said third container and sufficient heat to vaporize said liquid as said liquid contacts said third container, and means for igniting said gas-forming combustible substance and said third container being provided with means for disengaging said disengageable portion of said inner container upon expansion of said third container.

3. Apparatus for thermally vaporizing a liquid which comprises, in combination, an outer container and an inner container forming a space therebetween, liquid to be vaporized being disposed in said space, the top of said inner container being below the top of said outer container and being provided with multiple separately disengaging units, said inner container having disposed therein an expandable third container enclosing a gas-forming combustible substance which upon ignition forms sufficient gas to expand said third container and sufficient heat to vaporize said liquid as said liquid contacts said third container, means for igniting said gas-formng combustible substance and said third container being provided with a protuberance disposed to press against and disengage at least one of said separately disengaging units of said inner container upon expansion of said third container.

4. Apparatus for thermally vaporizing a liquid which comprises, in combination, an outer container and an inner container forming a space therebetween, liquid to be vaporized being disposed in said space, the upper level of said liquid being above the top of said inner container, the top of said inner container being provided with multiple separately disengaging units, said inner container having disposed therein an expandable third container enclosing a gas-forming combustible substance which upon ignition forms sufficient gas to expand said third container and sufficient heat to vaporize said liquid as said liquid contacts said third container, means for igniting said gas-forming combustible substance and said third container being provided with a protuberance disposed to press against and disengage one of said separately disengaging units of said inner container upon expansion of said third container and with means for pressing against and disengaging additional separately disengaging units of said inner container upon further expansion of said third container.

References Cited in the file of this patent

UNITED STATES PATENTS 2,367,955    Macintosh et al. ---------- Jan. 23, 1945